(12) United States Patent
Kao (10) Patent No.: US 6,659,654 B2
(45) Date of Patent: Dec. 9, 2003

(54) MULTI-CORE OPTICAL FIBER CONNECTOR

(75) Inventor: Tien-Lu Kao, La Mirada, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/075,358

(22) Filed: Feb. 13, 2002

(65) Prior Publication Data

US 2003/0152332 A1 Aug. 14, 2003

(51) Int. Cl.⁷ ................................................. G02B 6/36
(52) U.S. Cl. ........................................... 385/78; 385/56
(58) Field of Search ............................. 385/78, 56, 63, 385/90, 81, 71, 72, 77, 59, 60, 66, 139

(56) References Cited

U.S. PATENT DOCUMENTS

| | | | |
|---|---|---|---|
| 6,357,929 B1 * | 3/2002 | Roehrs et al. ................. | 385/59 |
| 6,394,661 B1 * | 5/2002 | Cull et al. ..................... | 385/59 |
| 6,565,264 B1 * | 5/2003 | Johnson et al. ................ | 385/78 |
| 2002/0037140 A1 * | 3/2002 | Ishibashi et al. .............. | 385/78 |
| 2002/0150348 A1 * | 10/2002 | Nguyen ........................ | 385/59 |
| 2002/0151207 A1 * | 10/2002 | Bates et al. .................. | 439/364 |

* cited by examiner

Primary Examiner—Hae Moon Hyeon
(74) Attorney, Agent, or Firm—Wei Te Chung (57) ABSTRACT

A fiber array (1) includes a plurality of ferrules (30), a plurality of optical fibers (36), a press plate (40), a holder plate (50), and a housing (10). Each ferrule defines a channel for retaining the corresponding optical fiber and an annular groove (32) for engagingly receiving a ring (38). The press plate defines a plurality of first through holes (46), and a plurality of posts (45) corresponding to the first through holes movably turn therein to abut against the ferrule. The holder plate (50) is secured together with the press plate and defines a plurality of second through holes (52) corresponding to the first through holes of the press plate for receiving and holding corresponding said ferrules. A plurality of springs (42) are interposed between the corresponding rings and the holder plate, and abut against the ring and the holder plate. Each ferrule can be slightly adjusted for exactly receiving transmitting light from a corresponding lens array by turning the post with an adjusting tool (60) and a wrench (70).

17 Claims, 8 Drawing Sheets

MULTI-CORE OPTICAL FIBER CONNECTOR

BACKGROUND OF THE INVENTION

1. Field of the Invention

The present invention relates to integrated fiber array and lens array assemblies used in optoelectronic light gathering systems, and particularly to such assemblies which require accurate matching between the fiber array and the lens array due to varying effective focal lengths of lenses of the lens array.

2. Description of Prior Art

Nowadays speed, bandwidth and scalability of optical interconnections are becoming more and more important in communications networks. Due to the increasing density of optical fibers, ultra high precision of two-dimensional multi-fiber array systems must be achieved. For instance, overall positional tolerances in optical switch light gathering systems should be maintained within ±2 $\mu$m. This is particularly important when light beams are gathered by a fiber array from a lens array in an optical switch.

U.S. Pat. No. 5,241,612 discloses a multi-core optical connector comprising a first connector part and a second connector part. The first connector part has a fiber array, a refractive index matching plate for preventing diffusion of beams, and a lens array. The second connector part has a fiber array and a lens array. A diameter of each of parallel beams that may be emitted outwardly from the lens array of the second connector part is larger than a diameter of parallel beams that may be emitted outwardly from the lens array of the first connector part. The first connector part and the second connector part are optically coupled such that both lens arrays are opposed to each other. The multi-core optical connector provides good alignment between the two fiber arrays, and minimizes axial deviation and angular deviation that may occur between the two fiber arrays. However, the multi-core optical connector does not provide accurate optical alignment between the fiber array and the lens array, as explained below.

Figure 1:
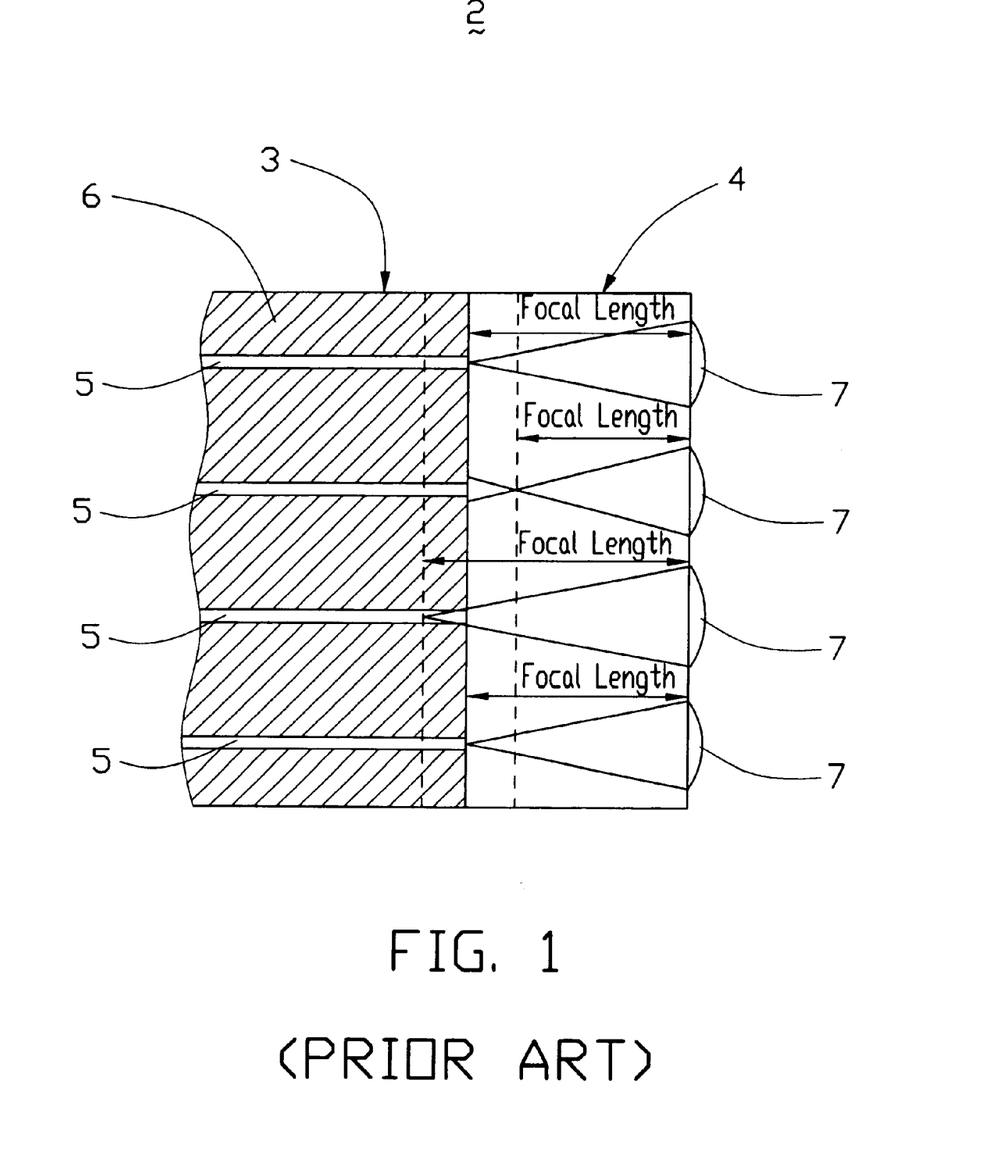
FIG. 1 is a schematic view of a conventional lens array block mounted to a conventional fiber array, showing variable focal lengths of lenses of the lens array block.

An optical entry point of each fiber of a fiber array should be accurately positioned to correspond to a focal point of the corresponding lens of the lens array. Each lens of a typical lens array has a different focal length, due to unavoidable manufacturing tolerances. However, the optical entry points of all fibers in a typical fiber array are substantially coplanar. Therefore, it is virtually impossible to accurately coincide the optical entry points of the fiber array with the focal points of the lens array. Referring to FIG. 1, a conventional optical assembly 2 includes a fiber array 3 and a lens array 4. The fiber array 3 has a plurality of optical fibers 5 arrayed in a holder 6. The lens array 4 is made from a block of silica material. An array of lenses 7 is formed on one side of the silica block, by etching and machining. When the lens array 4 is thus formed, variance in focal lengths among each of the lenses 7 unavoidably exists. Therefore, positions of the focal points of the lenses 7 are not coplanar. Thus the lens array 4 as formed cannot accurately transmit light to the fibers 5 of the fiber array 3. Similarly, the fibers 5 of the fiber array 3 cannot efficiently transmit light to the lens array 4.

SUMMARY OF THE INVENTION

In view of the above, an object of the present invention is to provide a fiber array in which each fiber can accurately receive transmitting light from each lens of a lens array.

Another object of the present invention is to provide a method for manufacturing a fiber array.

In order to achieve the objects set above, the present invention provides a fiber array, of which a position of each fiber is axially adjustable for exactly receiving transmitting light from a corresponding lens array. The fiber array comprises a plurality of ferrules each defining a channel for retaining a fiber therein. An annular groove is defined in each ferrule. A ring is engagingly received in the groove of the ferrule. A press plate defines a plurality of blind threaded apertures, and a plurality of posts corresponding to the blind threaded apertures. Each post abuts an end of the corresponding ferrule and is capable of axially moving by means of a tool and a wrench. A holder plate defines a plurality of through holes corresponding to the blind threaded apertures of the press plate for retaining the corresponding ferrules and is secured to the first plate. A plurality of springs are interposed between the corresponding rings and the holder plate, and opposite ends thereof respectively abuts against the rings and the holder plate.

Other objects, advantages and novel features of the invention will become more apparent from the following detailed description when taken in conjunction with the accompanying drawings, in which:

DETAILED DESCRIPTION OF PREFERRED EMBODIMENTS OF THE PRESENT INVENTION

Reference will now be made to the drawings to describe the present invention in detail.

Figure 2:
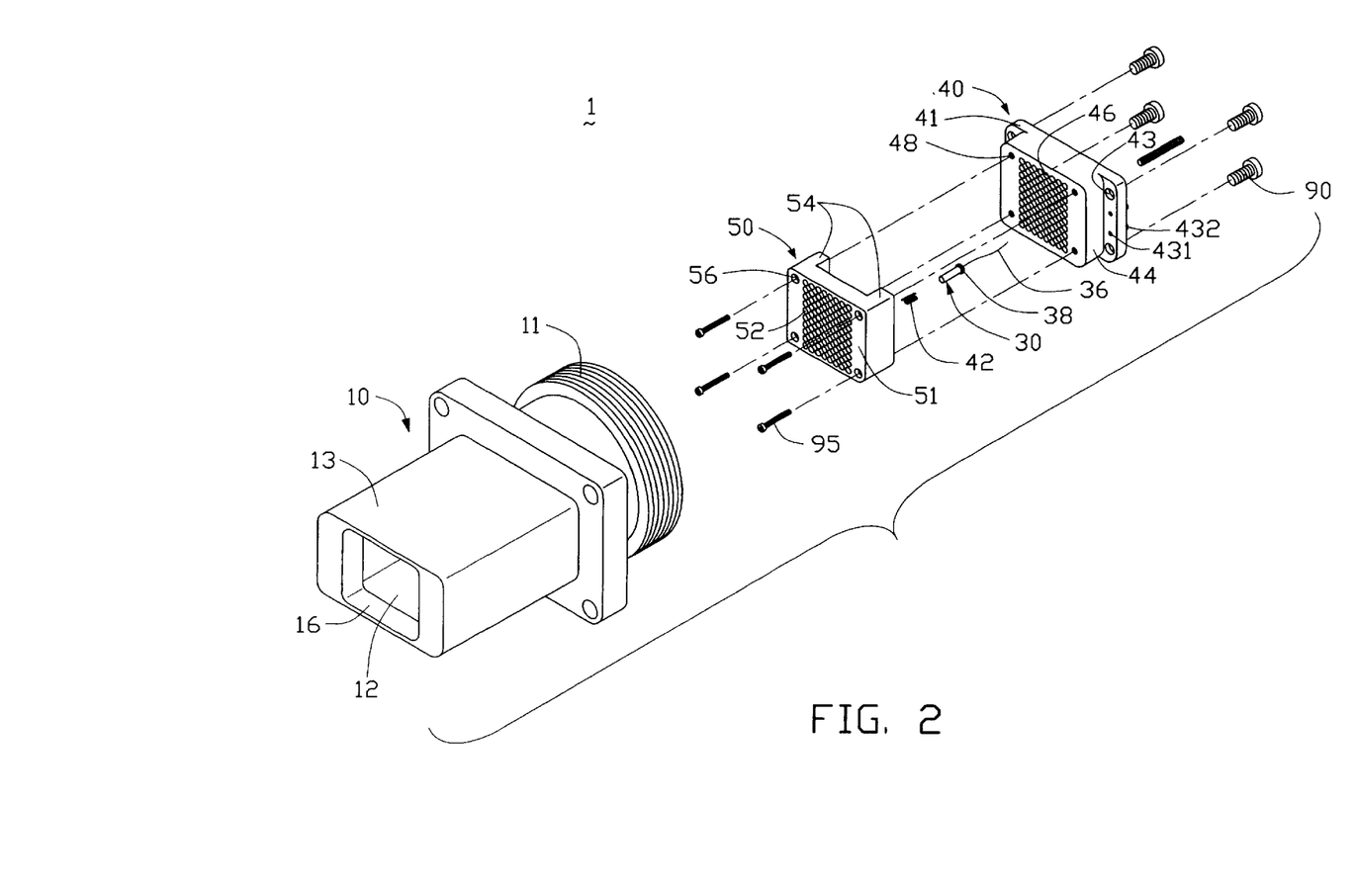
FIG. 2 is an exploded view of a fiber array of the present invention.
Figure 6:
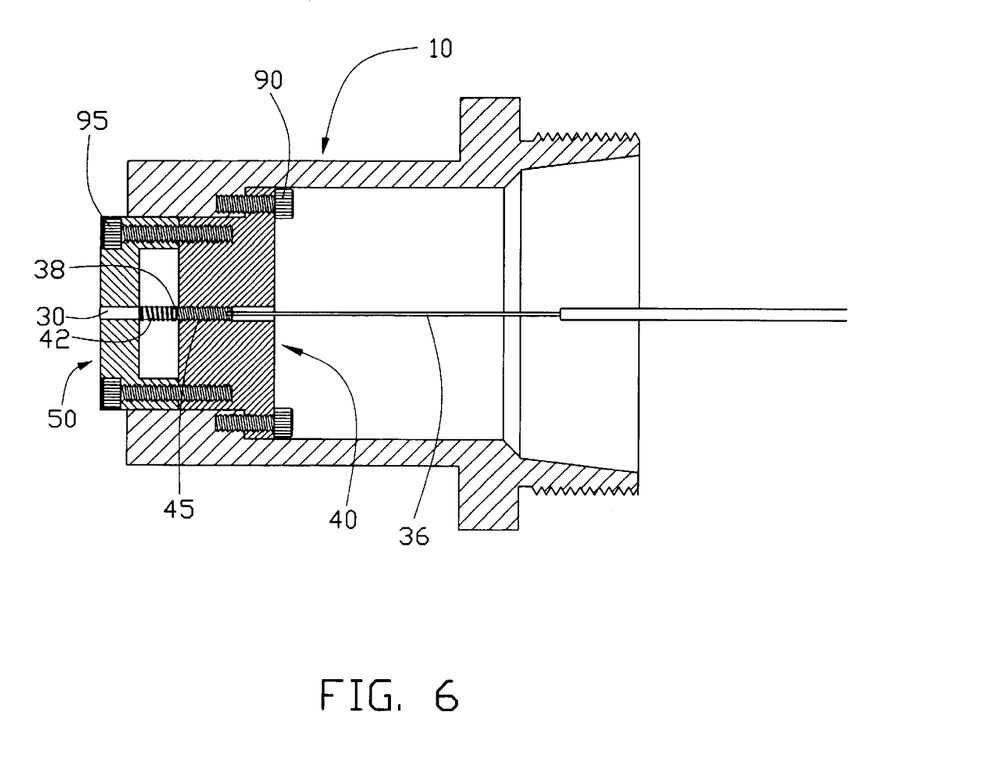
FIG. 6 is a cross-sectional view of the fiber array of FIG. 2 fully assembled.

Referring to FIGS. 2 and 6, a fiber array 1 in accordance with a preferred embodiment of the present invention comprises a housing 10, a plurality of ferrules 30 (only one shown), a plurality of optical fibers 36 (only one shown), a plurality of springs 42 (only one shown), a plurality of rings 38 (only one shown), a press plate 40 and a holder plate 50. The fiber array 1 is for coupling with a lens array (not shown).

Figure 3:
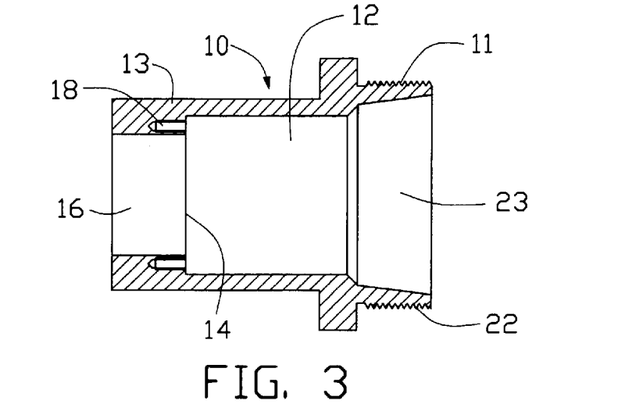
FIG. 3 is a cross-sectional view of a housing of the fiber array of FIG. 2.

Referring to FIG. 3, the housing 10 is generally made of stainless steel or plastic. The housing 10 comprises a cylindrical portion 11 and a first rectangular portion 13. A circular opening 23 is defined in the cylindrical portion 11. An external thread 22 is formed on an external surface of the cylindrical portion 11. A rectangular chamber 12 and a rectangular opening 16 are defined in the first rectangular portion 13, for receiving the press plate 40 therein. The rectangular chamber 12 is in communication with both the rectangular opening 16 and the circular opening 23 of the cylindrical portion 11. A step 14 are formed on an inner part of the first rectangular portion 13. Two threaded blind bores 18 are respectively defined in the step 14, for extension of bolts 90 thereinto to fix the press plate 40 to the housing 10.

Figure 4:
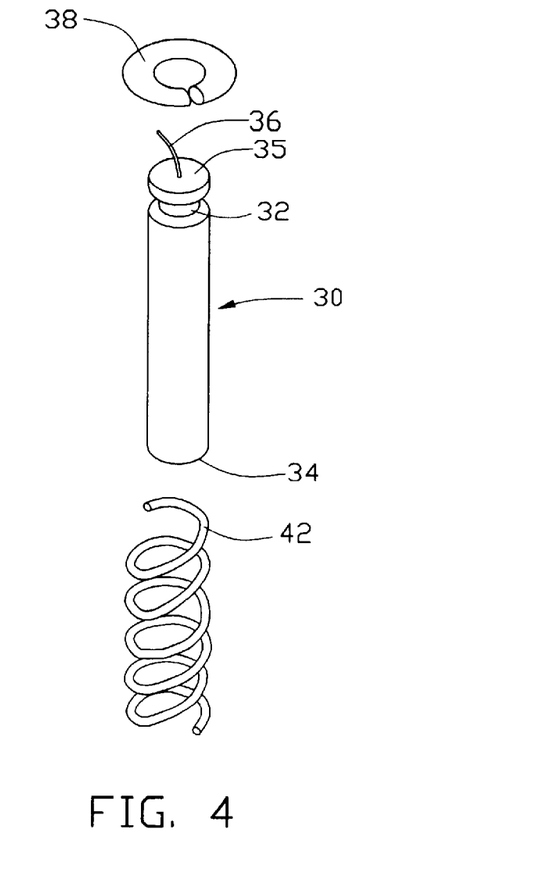
FIG. 4 is an enlarged perspective view of a ring, a ferrule retaining an optical fiber, and a spring, all of the fiber array of FIG. 2.

Referring to FIG. 4, each ferrule 30 is generally cylindrical. Each ferrule 30 comprises a first end 34 and an opposite second end 35. A longitudinal retaining hole (not shown) is defined in each ferrule 30, for extension of a corresponding fiber 36 thereinto. One end of the fiber 36 terminates flush with the first end 34 of the ferrule 30. A portion of the fiber 36 opposite to the first end 34 extends out from the second end 35 of the ferrule 30. An annular groove 32 is defined in the ferrule 30 near the second end 35. A corresponding ring 38 is engagingly received in the annular groove 32, with an outer diameter of the ring 38 being greater than a diameter of the ferrule 30.

Figure 5:
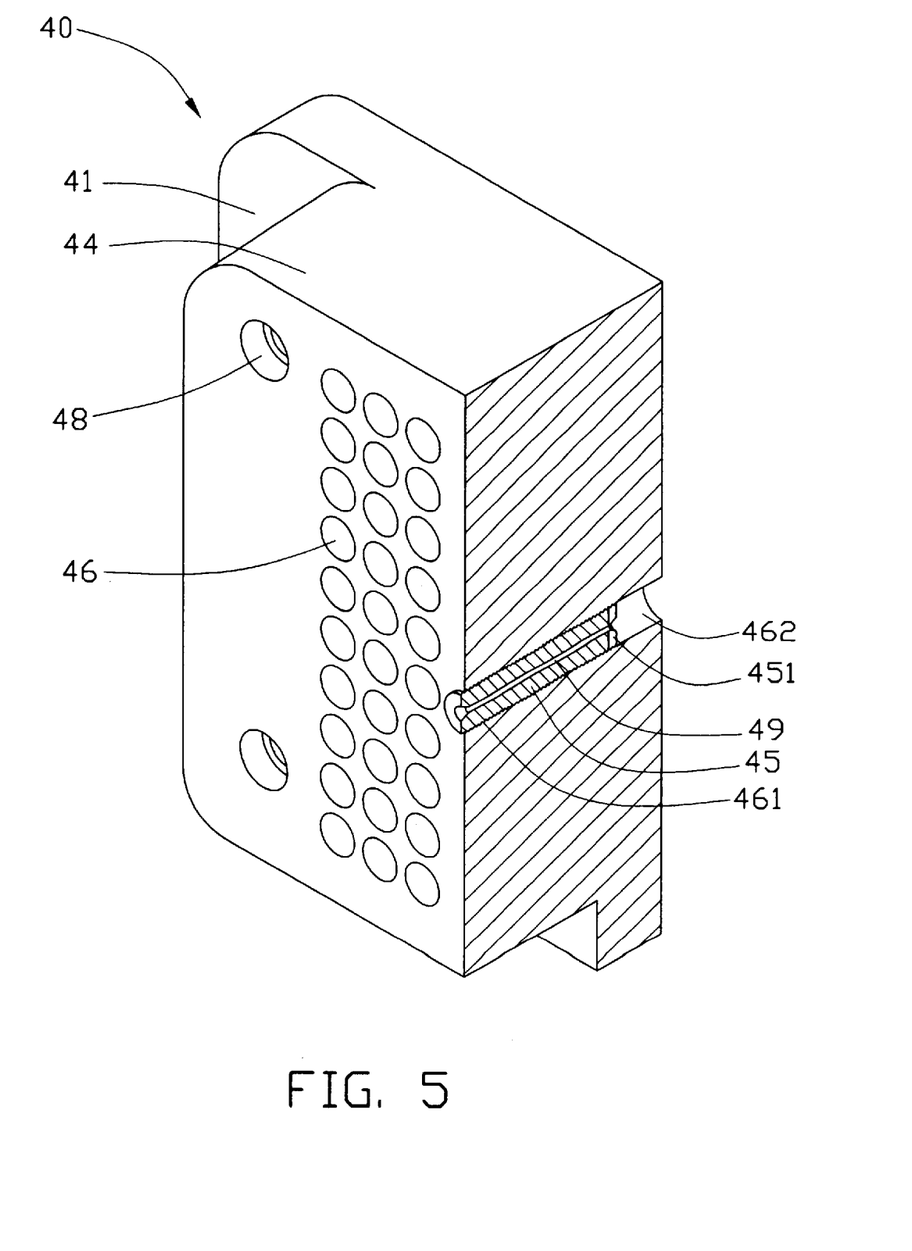
FIG. 5 is a cut-away perspective view of a press plate and a post of the fiber array of FIG. 2.

Referring to FIGS. 2 and 5, the press plate 40 is generally made of metallic material. The press plate 40 comprises a second rectangular portion 41 and a third rectangular portion 44. A front plan view profile of the second rectangular portion 41 is larger than that of the third rectangular portion 44. An array of first through holes 46 is defined through the combined second and third rectangular portions 41, 44. Each first through hole 46 comprises a first thread portion 461 and a second unthreaded portion 462. A diameter of the second unthreaded portion 462 is slightly greater than a minimum diameter of the first thread portion 461. Four through apertures 43 are respectively defined at four corners of the second rectangular portion 41, for extension of the bolts 90 therethrough. Two threaded through bores 431 are respectively defined near each of opposite edges of the second rectangular portion 41. Four adjusting screws 432 are threadedly engaged in the threaded through bores 431, to accurately adjusting the press plate 40 relative to the holder plate 50. Four threaded blind apertures 48 are respectively defined near each of four corners of the third rectangular portion 44, for threadedly receiving fixing screws 95 therein to fix the holder plate 50 to the press plate 40. A post 45 is threadedly engaged in the first thread portion 461 of each first through hole 46, with one end of the post 45 protruding out from the third rectangular portion 44 and abutting against the second end 35 of the corresponding ferrule 30. An adjusting slot 451 is defined in an opposite end of the post 45, for accurate adjustment of the post 45 using an adjusting tool 60 and a wrench 70.

Referring back to FIG. 2, the holder plate 50 comprises a rectangular block 51, and a pair of standoffs 54 respectively extending perpendicularly from two opposite sides of the rectangular plate 51. An array of second through holes 52 is defined in the holder plate 50, corresponding to the first through holes 46 of the press plate 40. A diameter of each second through hole 52 is generally equal to the diameter of each ferrule 30, for accurately retaining the ferrules 30 in position. Four countersunk threaded apertures 56 are respectively defined at four corners of the holder plate 50, corresponding to the threaded blind apertures 48 of the press plate 40.

Referring to FIG. 6, in assembly, a portion (not visible) of each fiber 36 is retained in the corresponding ferrule 30. A remaining portion of the fiber 36 is retained in the passage 49 of the corresponding post 45 with epoxy. One end of the post 45 protrudes out from the third rectangular portion 44, and abuts against the second end 35 of the corresponding ferrule 30. The corresponding spring 42 surrounds the ferrule 30 therein. One end of the spring 42 abuts against the ring 38, and an opposite end of the spring 42 abuts against an inner surface of the rectangular block 51 of the holder plate 50. The ferrule 30 is slidably retained in a corresponding second through hole 52 of the holder plate 50. The standoffs 54 of the holder plate 50 are attached to a main face of the third rectangular portion 44 of the press plate 40. The holder plate 50 is fixed to the press plate 40 by extension of the fixing screws 95 through the countersink threaded apertures 56 of the holder plate 50 and the threaded blind apertures 48 of the press plate 40. As a result, the spring 42 is compressed between the ring 38 and the inner surface of the rectangular block 51 of the holder plate 50.

Figure 7:
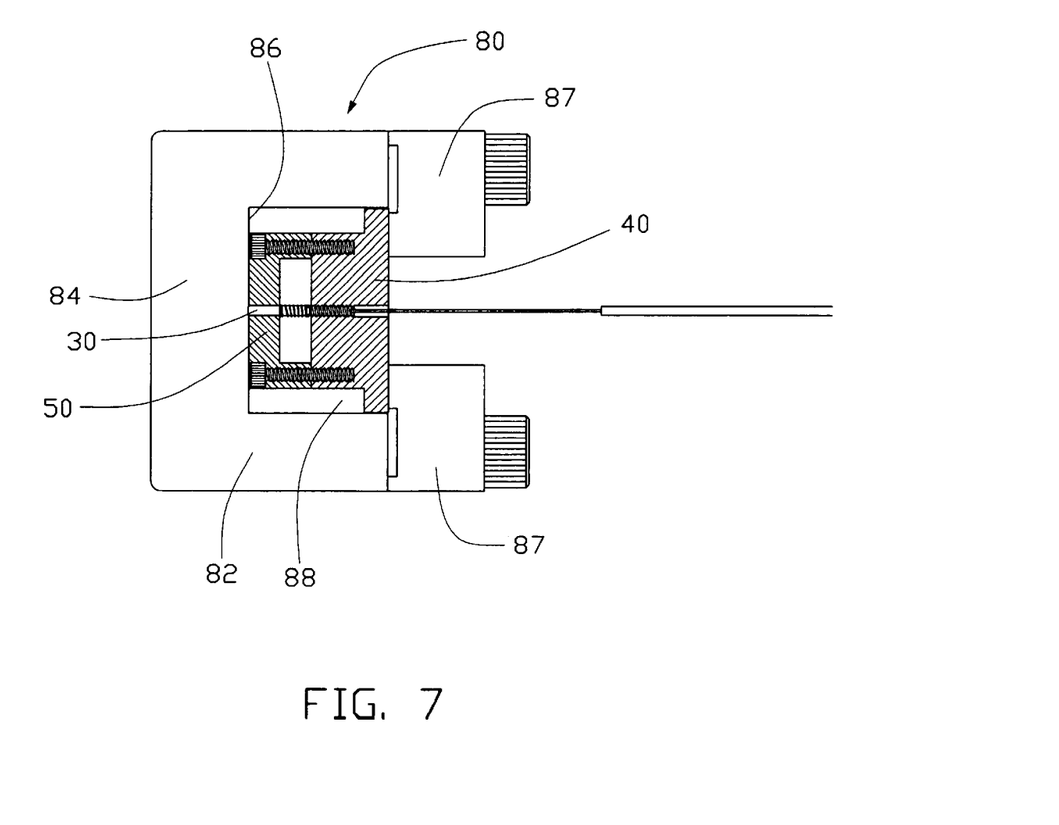
FIG. 7 is a schematic cross-sectional view of the press plate and a holder plate of the fiber array of FIG. 2 combined together, and fastened to a gauge block by two fasteners, showing adjustment of a position of a ferrule of the fiber array of FIG. 2 retained in the holder plate.

Referring to FIG. 7, a gauge block 80 is provided to assure coplanarity of the ferrules 30 retained in the holder plate 50. The gauge block 80 comprises a base 84 having a mirror surface 86, and two opposite sidewalls 82 extending from opposite ends of the base 84. The sidewalls 82 and the mirror surface 86 cooperate to define a space 88 therebetween. The combined press plate 40 and holder plate 50 is received in the space 88, and is tightly fastened to the gauge block 80 by two fasteners 87. Each post 45 is adjusted so that the first end 34 of the corresponding ferrule 30 flush with the mirror surface 86.

Referring to FIG. 6, the combined press plate 40 and holder plate 50 are then placed in the rectangular opening 16 and the rectangular chamber 12 of the housing 10. Two parallel faces of the second rectangular portion 41 that are at respective opposite sides of the third rectangular portion 44 of the press plate 40 abut against the step 14 of the housing 10. The second rectangular portion 41 of the press plate 40 is fixed to the step 14 by extension of the bolts 90 through the through apertures 43 to threadedly engage in the threaded blind bores 18 of the first rectangular portion 13 of the housing 10. A portion of the holder plate 50 protrudes out from the rectangular opening 16 to an exterior of the housing 10. The adjusting screws 432 are adjusted to abut against the step 14 and accurately adjusting the press plate 40 relative to the holder plate 50. This minimizes manufacturing tolerance.

Figure 8:
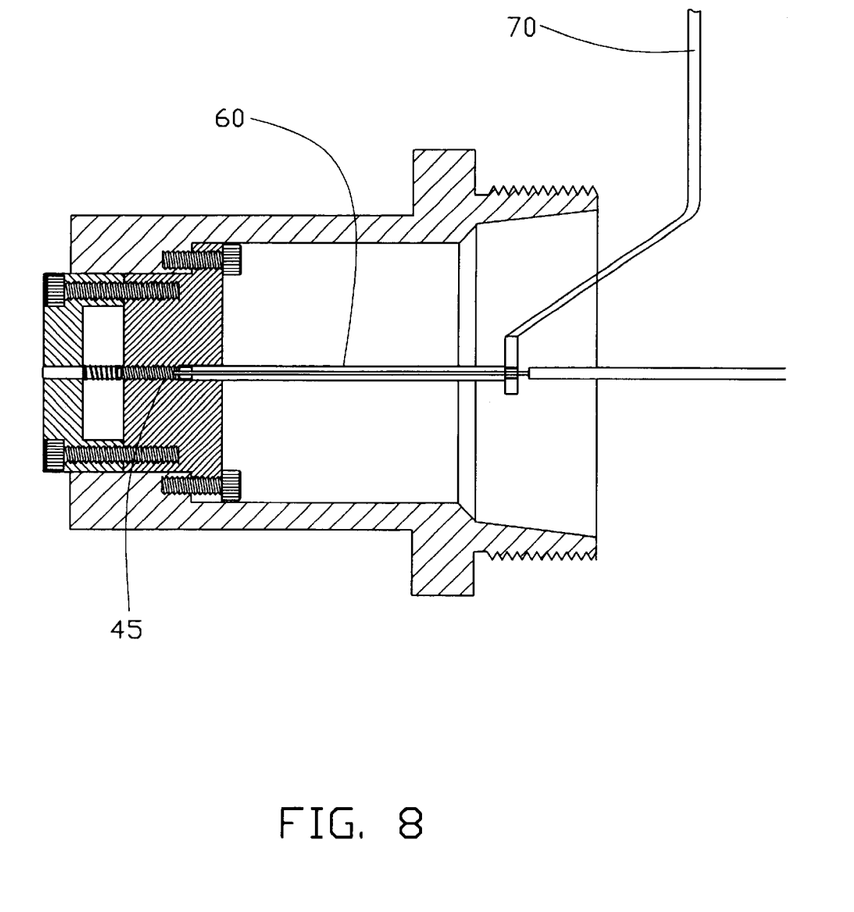
FIG. 8 is a schematic cross-sectional view, showing adjustment of the position of the ferrule in the fiber array of FIG. 2 using an adjusting tool and a wrench.
Figure 9:
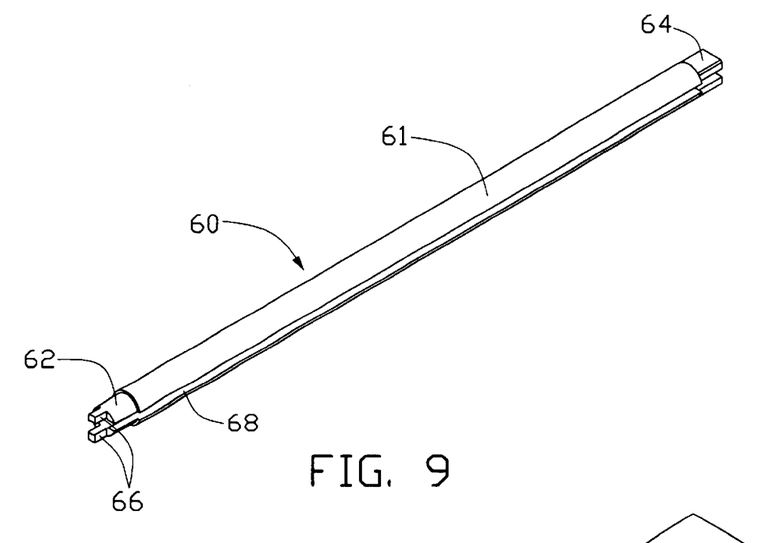
FIG. 9 is a perspective view of the adjusting tool of FIG. 8.
Figure 10:
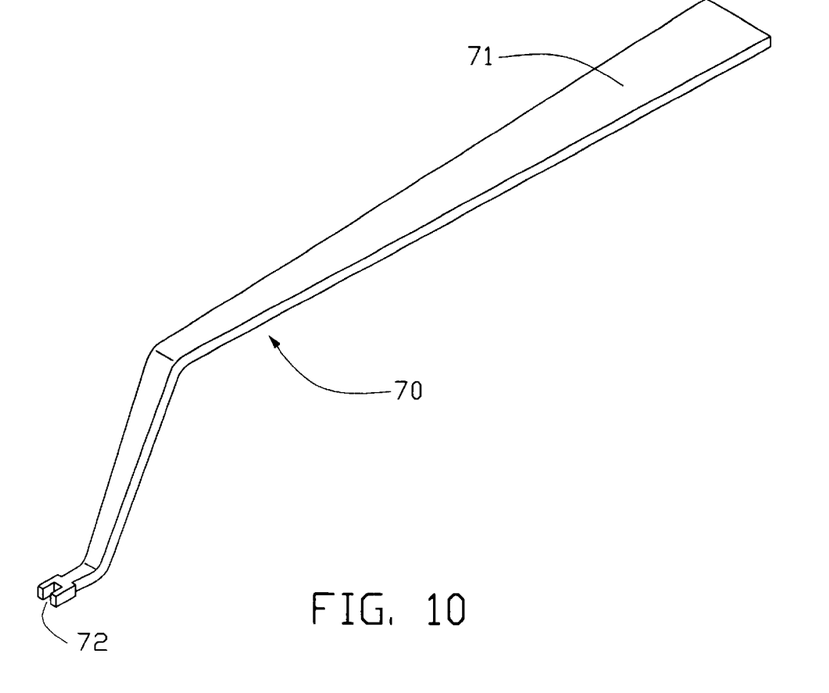
FIG. 10 is perspective view of the wrench of FIG. 8.

Referring to FIGS. 8–10, a method of alignment between the lens array (not shown) and the fiber array 1 comprises the steps of: (1) providing the lens array and attaching the lens array to the fiber array 1; (2) providing the adjusting tool 60 and the wrench 70, the adjusting tool 60 comprising a cylindrical main body 61, a first end 62, an opposite second end 64, and a longitudinal channel 68 defined in the main body 61, the first end 62 comprising an adjusting key 66, the second end 64 having a generally rectangular profile, the wrench 70 having a handle 71, and a quadrate notch 72 defined in an end of the wrench 70 that is opposite from the handle 71; (3) receiving one fiber 36 in the channel 68 of the adjusting tool 60, and engaging the adjusting key 66 of the adjusting tool 60 such that in the adjusting slot 451 of a corresponding post 45; (4) engaging the second end 64 of the adjusting tool 60 in the quadrate notch 72 of the wrench 70; (5) rotating the handle 71 of the wrench 70 to move the corresponding ferrule 30 forwardly or rearwardly such that a focal point of a corresponding lens of the lens array is located at an end surface of the corresponding fiber 36 at the first end 34 of the ferrule 30; repeating steps (3) through (5) for each of the other fibers 36.

In an alternative embodiment of the present invention, the press plate 40 and the holder plate 50 are integrally formed together as a single piece.

In the present invention, a position of each fiber 36 of the fiber array 1 can be accurately adjusted according to the focal length of the corresponding lens of the lens array. Consequently, light beams transmitted in the fiber array 1 can be efficiently coupled into the lens array. Similarly, light beams transmitted in the lens array can be efficiently coupled into the fiber array 1.

While the preferred embodiment in accordance with the present invention has been shown and described, and the alternative embodiment has been described, equivalent modifications and changes known to persons skilled in the art according to the spirit of the present invention are considered to be within the scope of the present invention as defined in the appended claims.

What is claimed is:

1. A fiber array comprising:
   a plurality of optical fibers, each of the fibers comprising a first portion and a second portion;
   a plurality of ferrules, each of the ferrules defining a longitudinal retaining hole therethrough for receiving the first portion of a corresponding fiber therein;
   a first plate defining a plurality of first through holes therethrough, a plurality of posts threadedly engaging in the first through holes respectively and corresponding to the ferrules, each of the posts defining a longitudinal passage for receiving the second portion of a corresponding fiber therein; and
   a second plate attached to the first plate, the second plate comprising a plurality of second through holes therethrough corresponding to the first through holes of the first plate, the second through holes respectively receiving the ferrules therein.

2. The fiber array as recited in claim 1, wherein each of the ferrules further defines an annular groove at a first end thereof.

3. The fiber array as recited in claim 2, wherein the fiber array further comprises a plurality of rings respectively engaged in the grooves of the ferrules.

4. The fiber array as recited in claim 3, wherein a plurality of springs is abuttingly interposed between the rings of the ferrules and the second plate.

5. The fiber array as recited in claim 1, further comprising a housing receiving the first plate and the second plate.

6. The fiber array as recited in claim 1, wherein the first plate further defines at least one threaded through bore in at least one of opposite sides thereof.

7. The fiber array as recited in claim 6, wherein at least one screw is engaged in the at least one threaded through bore, for accurately adjusting a position of the first plate relative to the second plate.

8. A method for manufacturing a fiber array, the method comprising the steps of:
   providing a plurality of posts, each of the posts defining a longitudinal passage therethrough;
   extending first portions of optical fibers through the passages of the posts respectively;
   providing a plurality of ferrules, each of the ferrules defining an annular groove therein;
   extending second portions of the fibers into the ferrules respectively;
   providing a plurality of rings, and engaging the rings in the grooves of the ferrules respectively;
   placing a spring around each of the ferrules respectively, with one end of each of the springs abutting against a corresponding ring;
   providing a first plate defining a plurality of threaded through holes, and engaging the posts in the threaded through holes respectively;
   providing a second plate defining a plurality of through holes respectively retaining the ferrules therein, and securing the second plate to the first plate with bolts such that an opposite end of each of the springs abuts against the second plate; and
   providing a housing, and fixing the first plate, the second plate, the ferrules and the springs in the housing.

9. The method as recited in claim 8, further comprising the step of providing a gauge having a mirror surface, and adjusting each of the posts such that a corresponding ferrule is flush with the mirror surface.

10. The method as recited in claim 8, further comprising the step of providing a lens array, attaching the lens array to the fiber array, and rotatingly adjusting a position of each of the posts such that an optical entrance of a corresponding fiber coincides with a focal point of a corresponding lens of the lens array.

11. The method as recited in claim 10, wherein the position of each of the posts is adjusted using a tool comprising a cylindrical main body, a first end and a second end opposite to the first end.

12. The method as recited in claim 11, wherein the first end comprises an adjusting key for engaging with an end of each of the posts.

13. The method as recited in claim 12, wherein a longitudinal channel is defined in the main body of the tool between the first end and the second end, for receiving a corresponding fiber therein.

14. The method as recited in claim 13, wherein the second end has a generally rectangular profile for facilitating engagement of the tool with a wrench.

15. The method as recited in claim 14, wherein the wrench has a handle, and defines a quadrate notch engagingly receiving the second end of the tool.

16. A fiber array comprising:

a first plate defining therein a plurality of through holes arranged in a matrix manner;

a plurality of ferrules snugly received in the corresponding through holes, respectively;

a second plate having a plurality of posts in the matrix manner corresponding to said through holes, said posts being in threaded engagement with the second plate and adjustably moveable relative to the second plate in an axial direction perpendicular to said second plate, each of said posts adjustably moving the corresponding ferrule relative to the first plate in said axial direction; and a plurality of fibers extending through the corresponding posts and ferrules, respectively, wherein a distal end of each of said fibers is retainably disposed in the corresponding ferrule.

17. A fiber array comprising:

a plurality of ferrules each comprising an outer surface, a first end and an opposite second end, and a longitudinal retaining hole defined therethrough for extension of a corresponding fiber thereinto;

a plate having a plurality of first and second through holes therein;

a plurality of posts threadedly engaging in the first through holes; and a plurality of springs exerting resilient force on the ferrules;

wherein the ferrules are held in the second through holes of the plate and are adjustable relative to a main face of the plate.

* * * * *